(12) United States Patent
Wang et al.

(10) Patent No.: US 6,565,610 B1
(45) Date of Patent: May 20, 2003

(54) METHOD AND SYSTEM FOR TEXT PLACEMENT WHEN FORMING MAPS

(75) Inventors: Yaoguang Wang, Rosemont, IL (US); David S. Lampert, Highland Park, IL (US); Shashi Jasthi, Mt. Prospect, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/248,600

(22) Filed: Feb. 11, 1999

(51) Int. Cl.$^7$ .............................................. G06F 17/00
(52) U.S. Cl. ........................ 715/517; 345/619; 345/855
(58) Field of Search ................................. 707/512, 517; 701/200, 207–213; 340/995; 345/581, 587, 619, 634–641, 855

(56) References Cited

U.S. PATENT DOCUMENTS

| | | | |
|---|---|---|---|
| 4,527,155 A | | 7/1985 | Yamaki et al. ......... 071985/340 |
| 4,646,089 A | | 2/1987 | Takanabe et al. ........... 340/995 |
| 4,757,455 A | | 7/1988 | Tsunoda et al. ............ 364/449 |
| 4,812,980 A | | 3/1989 | Yamada et al. ............ 364/449 |
| 4,914,605 A | | 4/1990 | Loughmiller, Jr. et al. . 364/518 |
| 4,996,645 A | | 2/1991 | Schneyderberg Van Der Zon .............. 364/449 |
| 5,297,051 A | | 3/1994 | Arakawa et al. ............ 364/449 |
| 5,559,938 A | | 9/1996 | Van Roekel et al. ........ 395/141 |
| 5,689,717 A | * | 11/1997 | Pritt ............................ 345/619 |
| 5,724,072 A | * | 3/1998 | Freeman et al. ............ 345/648 |
| 5,988,853 A | * | 11/1999 | Kim et al. ..................... 700/90 |
| 6,091,424 A | * | 7/2000 | Madden et al. ............. 345/619 |
| 6,092,076 A | * | 7/2000 | McDonough et al. ....... 345/866 |
| 6,154,219 A | * | 11/2000 | Wiley et al. ................. 345/581 |
| 6,226,646 B1 | * | 5/2001 | Geurts ........................ 707/100 |
| 6,330,858 B1 | * | 12/2001 | McDonough et al. ....... 101/208 |

OTHER PUBLICATIONS

Hirsch, Stephen A. An Algorithm for Automatic Name Placement Around Point Data. The American Cartographer, vol. 9, No. 1, 1982, pp. 5–17.*

Edmondson, Shawn, and Christensen, Jon. A General Cartographic Labeling Algorithm, Mitsubishi Electric Research Laboratories. Massachusetts: Jan. 1996. pp. 1–18.*

(List continued on next page.)

*Primary Examiner*—Joseph H. Feild
(74) *Attorney, Agent, or Firm*—Jon Shutter; Frank J. Kozak; Lawrence Kaplan

(57) ABSTRACT

A text placement program is disclosed. The text placement program provides for placement of text, such as names of geographic features, on a map image. A plurality of candidate locations for text placement are identified and provided to the text placement program. The text placement program evaluates each candidate location for text placement using an expression that includes a weighted clause of a first type indicative of whether the represented geographic feature is named at least once on the map image. If a candidate location being evaluated for text placement overlaps another candidate location, the expression for the candidate location being evaluated includes a weighted clause of a second type. One additional weighted clause of the second type is included for each occurrence of the candidate location overlapping another candidate location. For each candidate location, the text placement program evaluates the expression for two conditions: placement of text and no placement. The results of the two evaluations of the expression are compared and the condition that provides the greater result is selected. Optionally, the expression may include an additional weighted clause including a rank assigned to the represented geographic feature. The text placement program can be configured by adjusting the weightings assigned to the clause(s) of which it is formed.

20 Claims, 10 Drawing Sheets

OTHER PUBLICATIONS

UMI Dissertation Services, Automatic Map Name Placement System, J. Ahn (1984).

Auto–Carto Six, Proceedings of the Sixth International Symposium on Automated Cartography, vol. II, Automated Cartography: International Perspective On Achievements and Challenges, A Program For Automatic Name Placement, J. Ahn and H. Freeman (1985).

Computer–Assisted Cartography Principles and Prospects, Mark S. Monmonier (1982).

* cited by examiner

SAMPLE NAME TEXT STRINGS

"HIGGINS"

"OAKTON"

"MANNEHEIM"

"LEE"

METHOD AND SYSTEM FOR TEXT PLACEMENT WHEN FORMING MAPS

REFERENCE TO MICROFICHE APPENDIX

Included with and forming part of this specification is an a micofiche appendix including one sheet of 30 frames.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to forming maps and more particularly, the present invention relates to an improved process and system for placement of text on a map image to denote names of displayed features, such as roads.

Computer-generated map images have various uses. Some navigation systems, such as in-vehicle navigation systems, include display screens upon which map images can be shown to end users. Computer-generated map images are also generated and shown on other types of computing systems and platforms, including personal computers (including desktop and notebook computers), dedicated electronic devices (such as hand-held portable navigation systems), pagers, PalmPilot®-type devices, telephones, and networks (including the Internet).

Some map images are generated by software programs using geographic databases. A geographic database stores information about features located in a geographic region. The information included in a geographic database may include the geographic coordinates of the represented features such as roads and intersections, the names and highway numbers of the represented roads, the geographic coordinates of represented points of interests, the names of points of interests, and so on. Using the information in the geographic database and suitable software programming, a map image can be generated and rendered on a display screen. Alternately, using the information in the geographic database and appropriate software, a map can be printed or saved to a disk file for later use.

Persons who use maps are accustomed to the presentation of information in certain conventional ways. For example, it is expected that a line rendered on a map image represents a road and that the name of a road represented by a line be placed immediately adjacent to the line on the map image. It is preferable that maps generated from geographic databases conform to users' expectations.

Using a geographic database and appropriate software to generate a map image provides important, useful advantages for end users. When using a geographic database to generate a map on a display, the software program may allow the end user to select the area to be displayed, the scale, the level of detail, the kinds of points of interest to be displayed, and so on. Because these factors are selectable by the end user, the placement of the names of roads or other geographic features is not necessarily determined beforehand. Instead, the placement of the names of roads or other geographic features may not be determined until the boundaries of the map to be displayed are selected, the level of detail selected, and other configurable factors set. Accordingly, a means is required in the software programming to determine suitable locations for the placement of the names of the represented geographic features as part of the process of rendering the map image for display.

Programs that determine where to place names of geographic features on maps are known. However, prior programs are relatively slow and therefore require relatively long times to determine where to place the names of displayed geographic features on a map image. Because these prior programs for placement of names on a map image are relatively slow, they may be unsuitable for use on computing platforms that have relatively limited resources, such as some kinds of navigation systems, hand-held devices, and so on.

Accordingly, there is a need to provide an improved and faster means to determine the locations for placement of text, such as names of geographic features, on a map image.

SUMMARY OF THE INVENTION

To address these and other objectives, the present invention comprises a text placement program. The text placement program provides for placement of text, such as the names of geographic features, on a map image. A plurality of candidate locations for text placement are identified and provided to the text placement program. The text placement program evaluates each candidate location for text placement using an expression that includes a weighted clause of a first type indicative of whether the represented geographic feature is named at least once on the map image. If a candidate location being evaluated for text placement overlaps another candidate location, the expression for the candidate location being evaluated includes a weighted clause of a second type. For each candidate location, the text placement program evaluates the expression for two conditions: placement of text and no placement of text. The results of the two evaluations of the expression are compared and the condition that provides the greater result is selected. Optionally, the expression for each candidate location may include a third weighted clause that indicates a rank assigned to the represented geographic feature. The text placement program can be configured by adjusting the weightings assigned to the clause(s) of which it is formed. Each candidate location is evaluated in this manner until all the candidate locations are evaluated. Text is then placed in the selected candidate locations.

DETAILED DESCRIPTION OF THE PRESENTLY PREFERRED EMBODIMENTS

I. Overview

Figure 1:
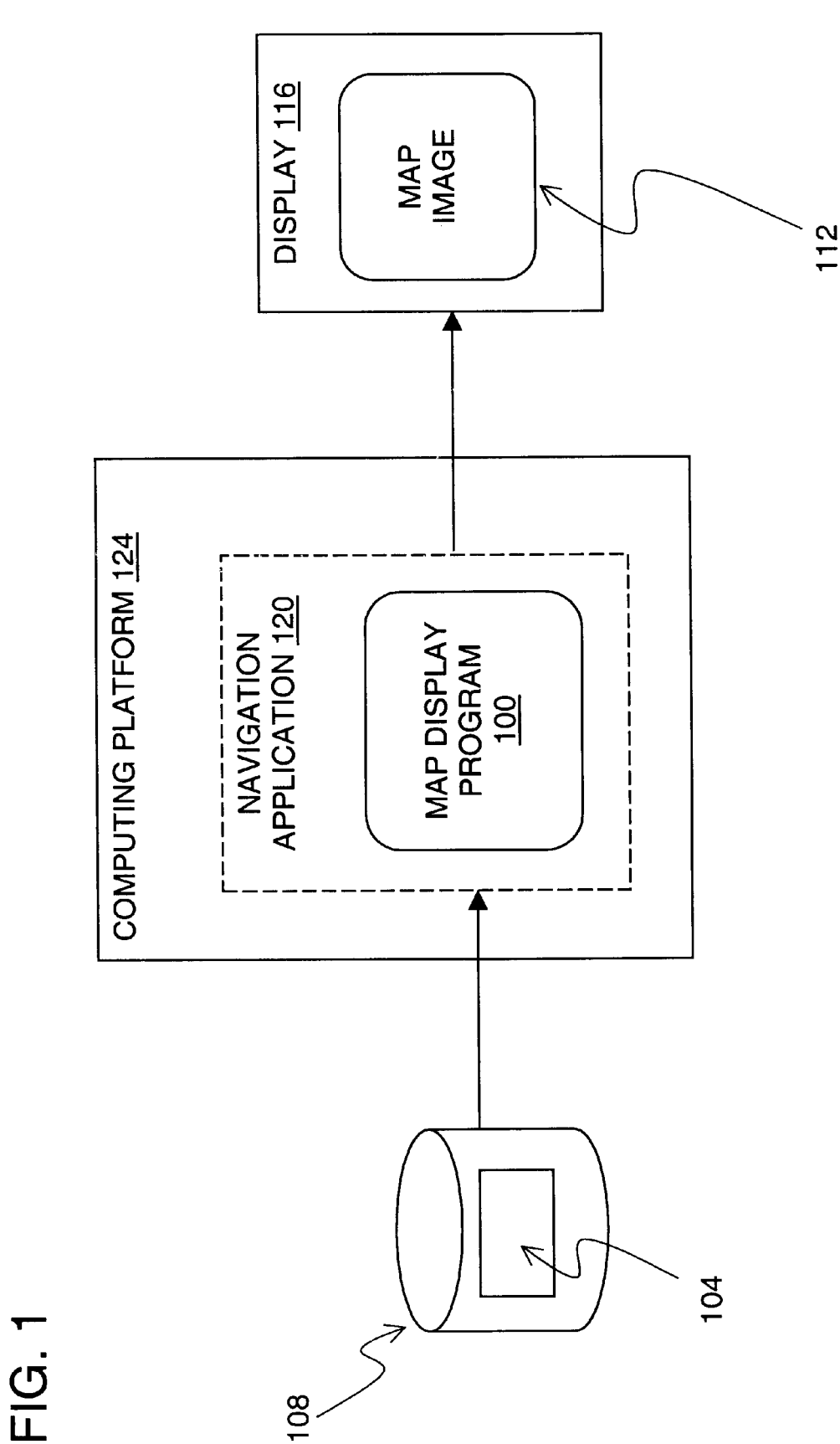
FIG. 1 is a block diagram illustrating a map display program installed in a computing platform according to first embodiment.

Referring to FIG. 1, there is shown a diagram of a map display program 100. The map display program 100 is installed on a suitable computing platform 124. Many and various kinds of computing platforms are suitable. Suitable platforms include navigation systems (such as in-vehicle navigation systems), personal computers (including desktop and notebook computers), dedicated electronic devices (such as hand-held portable navigation systems), pagers, and PalmPilot®-type devices. The map display program 100 may also be installed on a networked computing platform or environment, including the Internet. In one embodiment, the map display program 100 is loaded into a memory of the computing platform 124 and stored on a non-volatile, computer readable medium when it is not in use.

The map display program 100 uses geographic data 104 stored in a geographic database 108. The map display program 100 uses the geographic data 104 to generate a map image 112 on a display 116. The display, 116 may be a part of, or associated with, the computing platform 124, or may be separate, standalone device.

The map display program 100 may be part of a navigation application program 120 that also performs other functions, such as route calculation, route guidance, vehicle positioning, and so on. Alternatively, the map display program 100 may be a standalone application, or may be included with programs or applications that provide other functions or features. The navigation application 120 may be installed on the same computing platform 124 as the map display program 100 or may be installed on another computing platform.

II. The Geographic Database

The geographic data 104 includes information about one or more geographic regions or coverage areas. The geographic data 104 may be stored locally at the location of the map display program 100, or alternatively, the geographic data 104 may be stored remotely and made available to the map display program 100 through a communication system which may be part of the hardware platform 124. In another alternative, a portion of the geographic data 104 may be stored locally and a portion of the geographic data 104 may be stored remotely and made available to the map display program 100 over a communication system from a remote location. The geographic data 104 is stored on a suitable storage medium, such as a CD-ROM disk, a DVD disk, a hard disk, or other type of storage medium available now or in the future.

The geographic data 104 includes data that represents geographic features in the covered area and attributes of the represented geographic features. For example, the geographic data 104 includes data representing roads, such as the geographic coordinates of positions on the roads and street names of the roads. The geographic data 104 may include the street addresses along the roads. The geographic data may also include information about points of interest in the covered geographic area, such as hotels, restaurants, museums, stadiums, offices, automobile dealerships, auto repair shops, etc. The geographic data 104 may include data about the locations of the points of interests. The geographic data may also include information about places, such as cities, towns, or other communities. The geographic data 104 may include other kinds of data.

As stated above, the map display program 100 uses the geographic data 104 stored in a geographic database 108. The geographic database 108 may also include information that is used by the other functions included in the navigation application 120.

One way that the use of the geographic data can be enhanced for performing various navigation functions is to provide separate collections or subsets of the geographic data. Each of these separate collections or subsets is tailored specifically for use by one or more function. For example, the map display program 100 requires only certain kinds of information, such as the locations of roads, the locations of points of interest, data defining the shapes of the roads, the names of the roads, the names of points of interest, and possibly other information. However, the map display program 100 may not require other kinds of information associated with a road, such as the speed limits along the roads or turn restrictions along the roads. If the map display program 100 is part of a navigation application program 120 that also provides other functions, such as route calculation or route guidance, the geographic database 108 may include separate collections of data which are useful for performing these functions.

Figure 2:
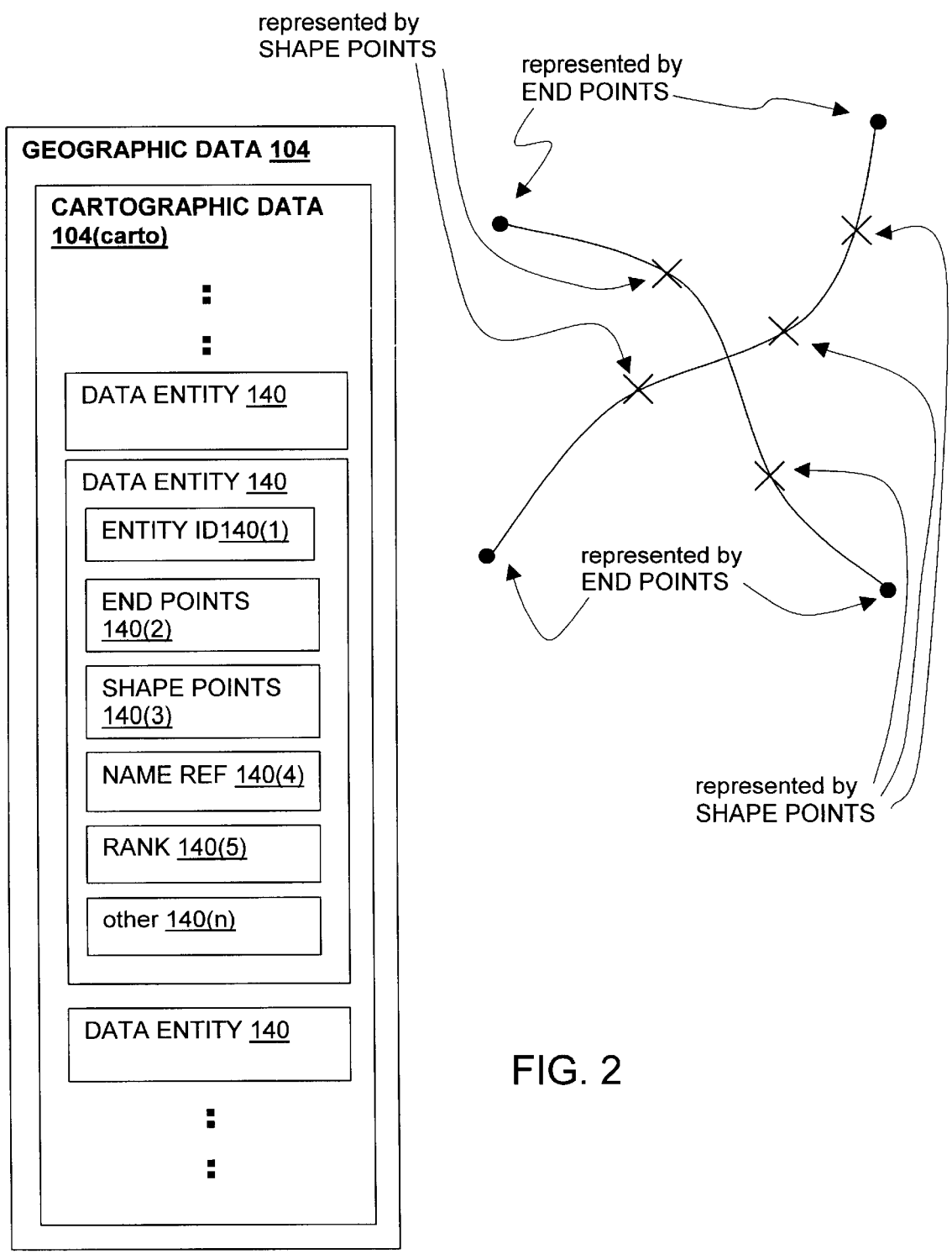
FIG. 2 is a block diagram illustrating the components of the cartographic type of data included in the geographic database shown in FIG. 1.
Figure 3:
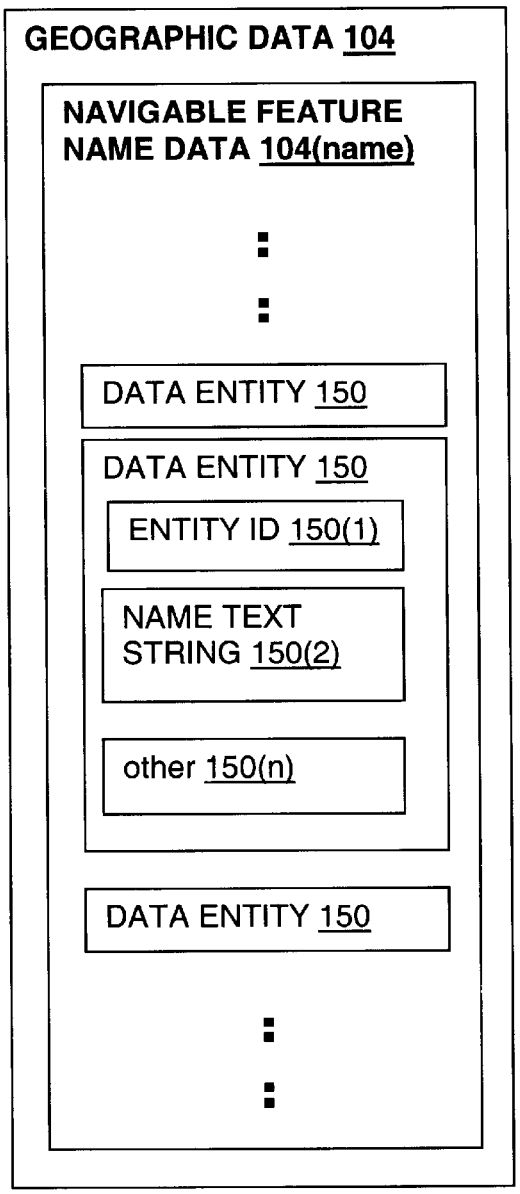
FIG. 3 is a block diagram illustrating the components of the navigable feature name type of data included in the geographic database shown in FIG. 1.

Referring to FIGS. 2 and 3, the geographic data 104 includes cartographic data 104(carto) and navigable feature name data 104(name). The cartographic data 104(carto) and the navigable feature name data 104(name) are used by the map display program 100 (in FIG. 1). FIG. 2 shows a block diagram illustrating the components of the cartographic data 104(carto). FIG. 2 also shows an illustration of the aspects of the geographic features that are represented by the cartographic data 104(carto). The cartographic data 104(carto) is comprised of a plurality of cartographic data entities 140. Each cartographic data entity 104 represents a continuous portion of a linearly extending geographic feature, such as a road. The cartographic data 104(carto) may include data entities that represent other kinds of geographic features, such as rivers, railroads, parks, lakes, and so on. Alternatively, these other kinds of geographic features may be represented by one or more other kinds of data entities.

Associated with each cartographic data entity 140 is an entity ID 140(1). The entity ID 140(1) is a unique number associated with the cartographic data entity 140. Also associated with each cartographic data entity 140 are the coordinates 140(2) of the end points of the represented geographic feature. If the represented feature is other-than-straight, the cartographic data entity 140 also includes one or more shape points 140(3). The shape points 140(3) represent the geographic coordinates of positions along the represented geographic feature. The cartographic data entity 140 may also include a name reference 140(4). The name reference 140(4) refers to the name of the represented geographic data feature. In the embodiment of FIG. 2, the name reference 140(4) is a reference to another type of data entity included among the geographic data 104. Specifically, the name reference 140(4) refers to a data entity included in the navigable feature name data 104(name).

Each cartographic data entity 140 also includes data 140(5) that identifies the rank of the corresponding portion of the road that it represents. A rank of a road segment may correspond to its functional class. For example, roads having a rank of "4" may include high volume, controlled access roads, such as expressways and freeways. Roads having a rank of "3" may be high volume roads with few speed changes, but are not necessarily controlled access roads. The lower ranked roads handle corresponding lower volumes and generally have more speed changes or slower speeds. Roads having a rank of "0" can handle the lowest volumes. For example, these lowest ranked roads may include side streets, alleyways, etc. The map display program 100 can use the rank data to provide different levels of detail and different map scales in a map display image.

The cartographic data entity 140 may also include other data 140(n).

FIG. 3 is a block diagram of the navigable feature name data 104(name). FIG. 3 also illustrates the aspects of the geographic features that are represented by the navigable feature name data 104(name). In FIG. 2, the navigable feature name data 104(name) is comprised of a plurality of navigable feature name data entities 150. Each navigable feature name data entity 150 contains the name of a navigable feature represented by one or more navigable feature data entities 140. Each navigable feature name data entity 150 includes an entity ID 150(1) which is a unique number associated with the navigable feature name data entity 150. Also associated with each navigable feature name data entity 150 is name data 150(2). The name data 150(2) contains a text string of the name of the represented navigable feature (e.g., the name of the street). For example, the name data 150(2) in one name data entity 150 may be "HIGGINS", the name data 150(2) in another name data entity 150 may be "OAKTON", the name data 150(2) in a third name data entity 150 may be "MANNEHEIM", the name data 150(2) in a fourth name data entity 150 may be "LEE", and so on.

A geographic feature having the same name may be represented by more than one cartographic data entity 140. However, each of these cartographic data entities can refer to the same navigable feature data entity 150.

In one embodiment, the geographic data are provided by Navigation Technologies Corporation of Rosemont, Ill. However it is understood that the inventive concepts disclosed herein are not restricted to any particular source of data.

Figure 4:
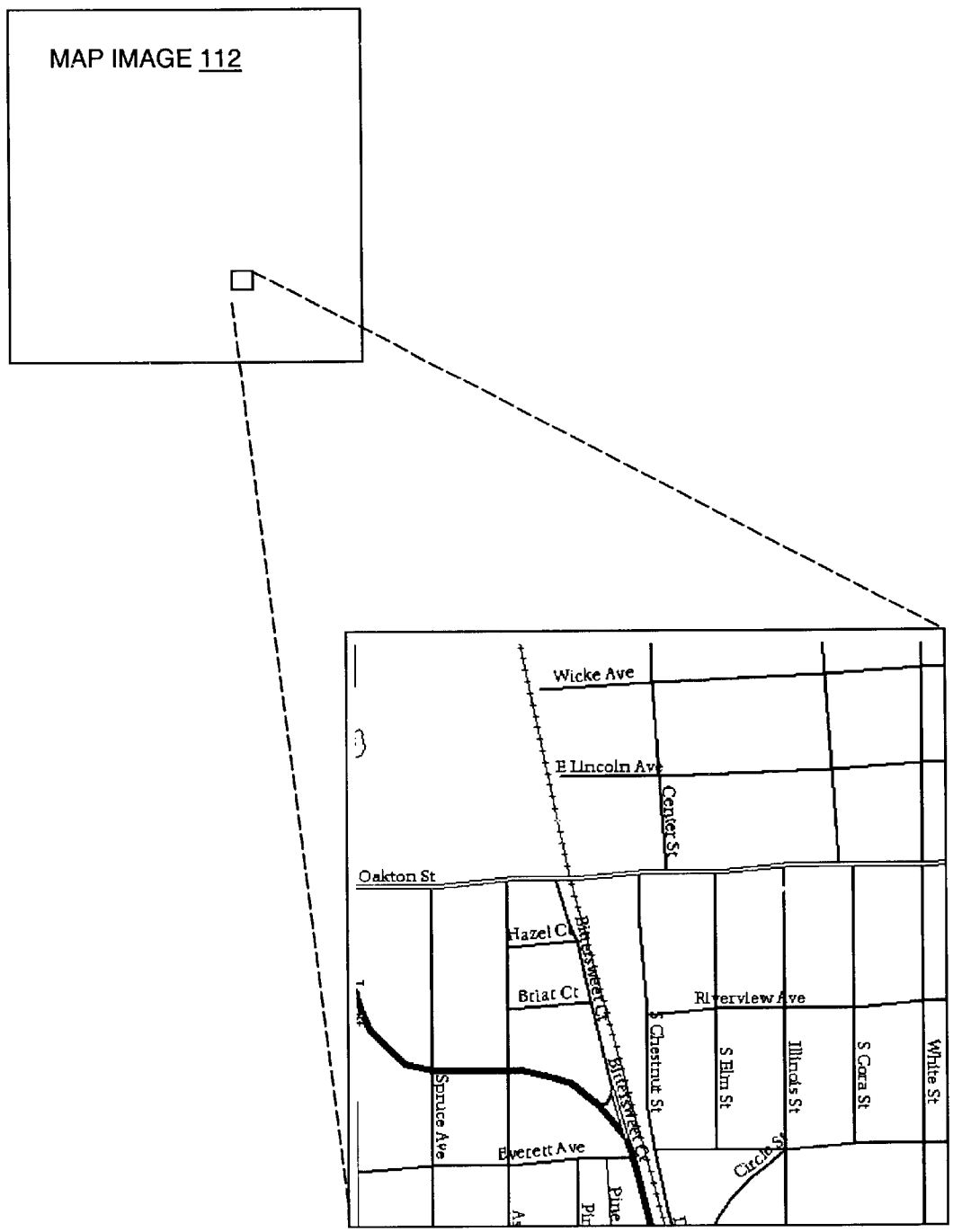
FIG. 4 is an illustration of the map image shown in FIG. 1 with a portion of the map image enlarged.

As mentioned above, the map display program 100 (in FIG. 1) uses the geographic data 104 to render a map image 112 on a display 116. FIG. 4 shows the map image 112 with a portion enlarged to illustrate detail. Included in the image 112 are a plurality of lines that represent geographic features, such as roads. The positions at which the lines are portrayed in the image are derived from the cartographic data 140, which includes data identifying the end points and shape points of the represented geographic features, as described above. Also included in the image 112 are text strings. The text strings are the names of the geographic features represented by the lines. The text strings are obtained from the navigable feature name data 104(name) in the geographic database 108.

III. Generation of Candidate Locations

Figure 5:
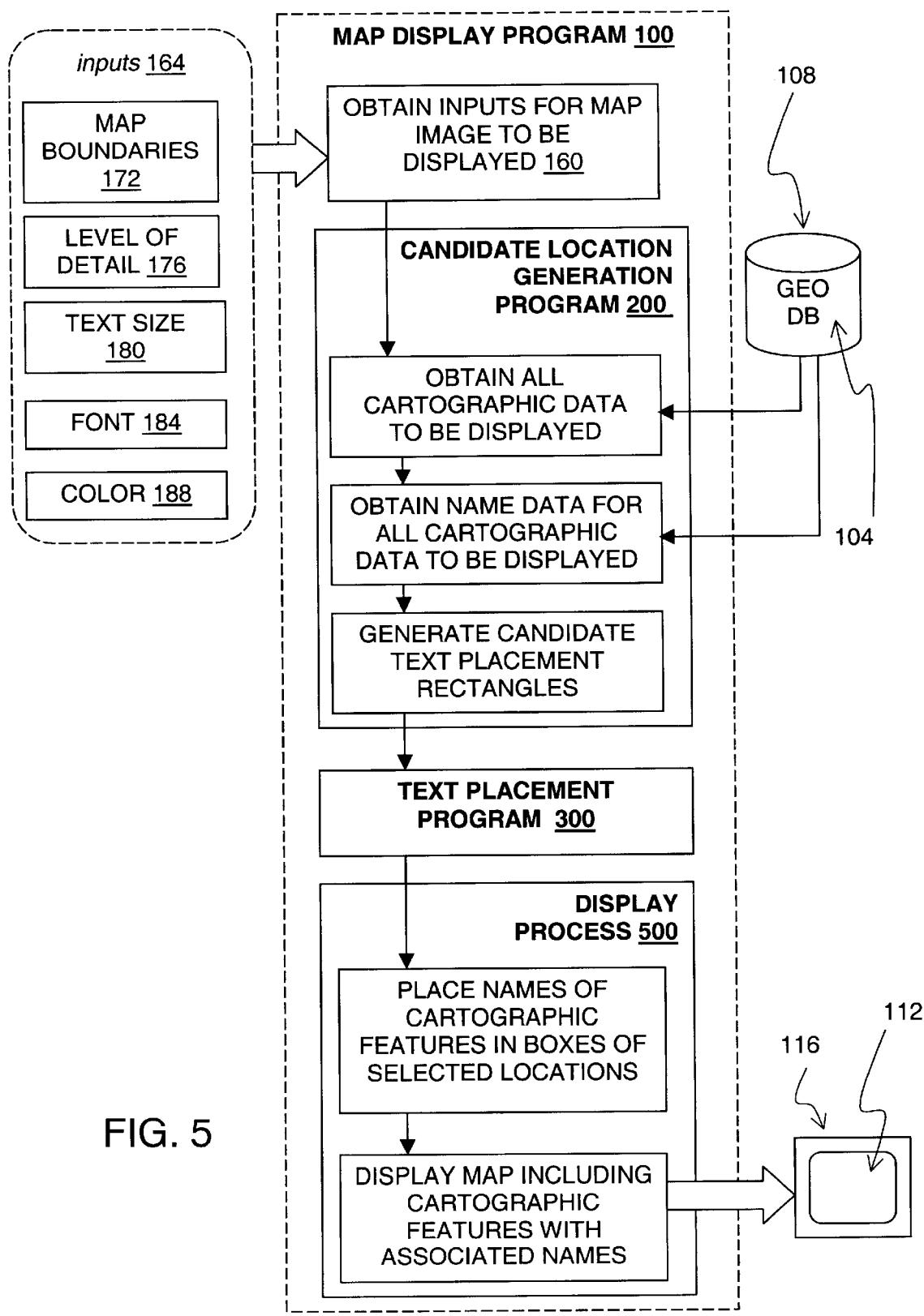
FIG. 5 is a block diagram illustrating the components of the map display program shown in FIG. 1.

FIG. 5 shows components of the map display program 100. The components of the map display program 100 shown in FIG. 5 are those pertinent to the description of the subject matter disclosed herein, and it is understood that the map display program 100 may include additional components, subroutines, subprograms, or features which are known to those of skill in the art.

A. Inputs for Displaying Names of Represented Geographic Features

Referring to FIG. 5, the map display program 100 includes a process 160 that receives inputs 164. These inputs 164 are used to by the map display program 100 to determine what to include in the map image 112 to be rendered on the display 116. Some or all of these inputs 164 may be provided by the end user via a user interface of the computing platform, or alternatively, some)or all of these inputs may configurable or provided by default parameters.

Included among the inputs 164 are the map boundaries 172. The map boundaries 172 may be selected by the end user or may be determined by default or configured parameters. The end user may select these boundaries by manipulating an appropriate input device, such as a keyboard, keypad, or pointing device, included in the user interface of the computing platform. The map boundaries 172 define the outside boundaries of the geographic area to be represented in the map image 112 to be displayed. The geographic area represented in the map image may be selected to any size of area within the entire coverage area of the geographic database 108. For example, the displayed area may be an entire country, such as the United States or France. The displayed area may also be an entire region, such as the West Coast or the Midwest. The displayed area may also be a state, a metropolitan area, a municipality, or other administrative area. The displayed area may also be defined by selected geographic coordinates, such as the area bounded by x and x+n longitude y and y+m latitude.

Another of the inputs 164 is the level of detail 176. The level of detail 176 may be specified by the end user or the level of detail 176 may be specified by configured or default parameters. Alternatively, the level of detail 176 may be derived as a function related to the displayed area. Maps that have a relatively large displayed area may have correspondingly less level of detail. For example, a map of an entire state may show only major roads and omit displaying secondary roads. The level of detail provided in a map image may also be related to the physical size of the hardware used for the map display. For example, a map displayed on a relatively large screen computer monitor may show a correspondingly greater level of detail, whereas a map displayed on a relatively small flat panel LCD screen in a navigation system may show a correspondingly lesser level of detail.

Another of the inputs 164 defines the size of the text 180 used on the map image. The size of the text 180 may be selected by the end user or may be specified by configured or default parameters. Also, the size of the text 180 may be defined by a function that relates the size of the text to the size and kind of the physical hardware used to display the map image. More than one text size may be used for names on a map display. Different text sizes may be used for different kinds of geographic features or for different ranks of roads.

Another of the inputs 164 is the font 184. This input may be selected by the end user or may be specified by a configurable or default parameter. More than one font may be used for names on a map display image. Different fonts may be used for different kinds of geographic features or for different ranks of roads.

Another of the inputs 164 is color 188. This input may be selected by the end user or may be specified by a configurable or default parameter. More than one color may be used for names on a map display image. Different colors may be used for different kinds of geographic features or for different ranks of roads.

Some or all of the above noted inputs features may be defined in a configuration file included in a non-volatile data storage medium included in the computing platform in which the map display program 100 is installed.

Using the inputs 164, the map display program 100 includes processes that render the map image 112 on the display 116. Included among the component processes in the map display program 100 are a candidate location generation program 200 and a text placement program 300. (The map display program 100 includes other sub-programs or components in addition to these.) The candidate location generation program 200 identifies candidate locations for text placement. The candidate location generation program 200 identifies locations in the map image adjacent to the representations of geographic features at which the name of the represented geographic feature can be placed. One type of candidate location generation program 200 is described below. The candidate locations identified by the candidate location generation program 200 are made without regard to whether the text of the name of the represented geographic feature included at the candidate location might overlap with the text of the name of any other represented geographic feature. Thus, if text were placed at all the candidate locations identified by the candidate location generation program 200, the overlapping text could render the map image unreadable. The text placement program 300 performs the function of selecting which of the candidate locations identified for placement of text should be used.

Source code for an embodiment of the text placement program is included in an appendix that forms a part of the present specification.

B. Identifying Candidate Locations

There are various processes for determining candidate locations for text placement. The text placement program 300, described below, is not limited to any particular program or process. According to one procedure, candidate locations for placement of text are defined along some or all of the lines or other geometric shapes used to represent geographic features to be represented on the map image. Each candidate location represents a rectangular area (also referred to as a "text box") on the map image. Each rectangular area is located adjacent to the line or other geometric shape used to represent the geographic feature in the map image. The rectangular area has a length sufficient to contain the text string of the name of the represented geographic feature. The rectangular area may be located above the geographic feature for features that extend generally horizontally on the display. The rectangular area is positioned at an angle, if necessary, so that the side of the rectangular area closest to the line or other geometric shape used to represent the associated geographic feature is approximately parallel thereto.

Figure 6:
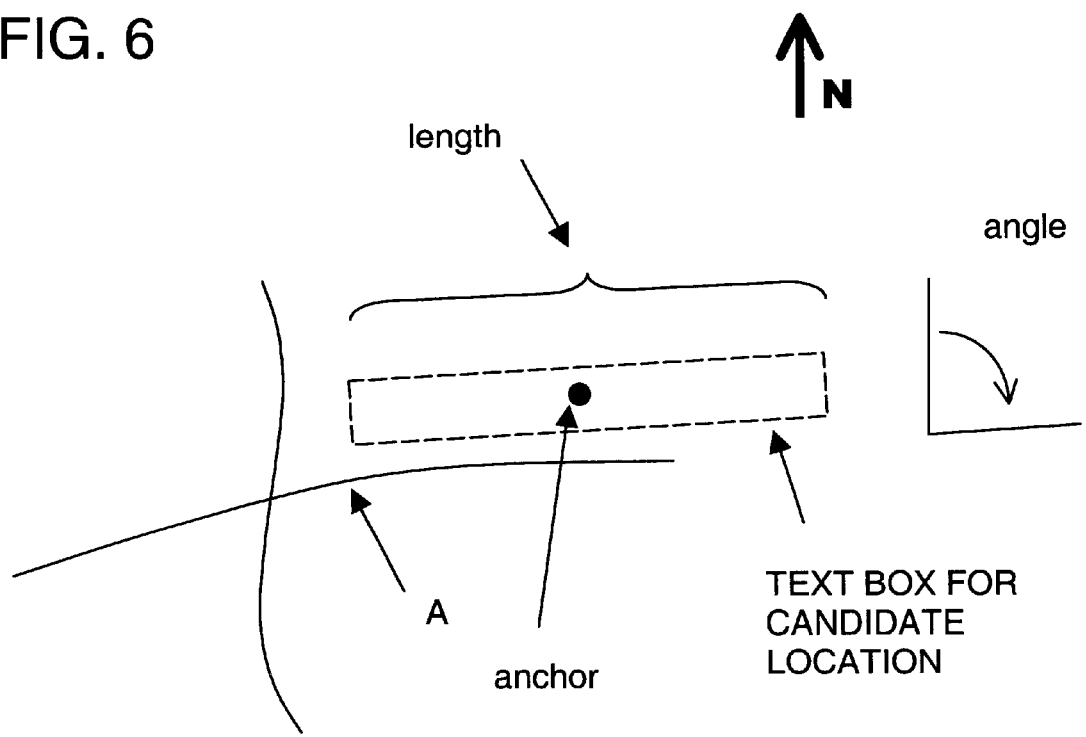
FIG. 6 is an illustration of a text box for a candidate location produced by the candidate location generation program shown in FIG. 5.

FIG. 6 shows an example of a text box formed to contain the name of a represented geographic feature. In FIG. 6, the represented geographic feature is a street represented by a line labeled "A." A rectangular area in dashed lines is shown located adjacent to the line labeled "A." The rectangular area forms a candidate text box. Each rectangular area is defined by an anchor, an angle, and a length. The anchor defines the geographic coordinates of the center of the rectangular area. The angle of the rectangular area is defined to be the angle along the length of the rectangular area relative to a defined direction, e.g., north. (The defined direction may be arbitrarily selected so long as it is consistently used for all the candidate text boxes formed for the map display image.) The length of the rectangular area is directly related to the length of the text string for the name of the represented geographic feature. (The length and height of the text box are also related to the size and type of font used for displaying the name of the represented geographic feature. For purposes of this disclosure, it is understood that these factors have already been specified.)

Figure 7A:
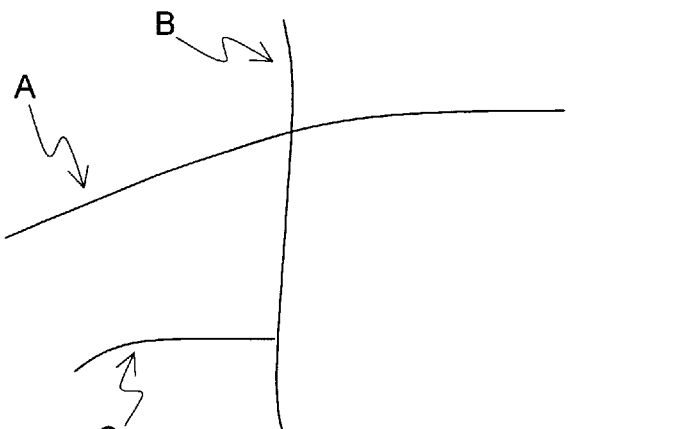
FIGS. 7A, 7B, and 7C are diagrams illustrating steps in a process for generating text boxes for candidate locations for placement of names of represented geographic features according to the candidate location generation program shown in FIG. 5.
Figure 7B:
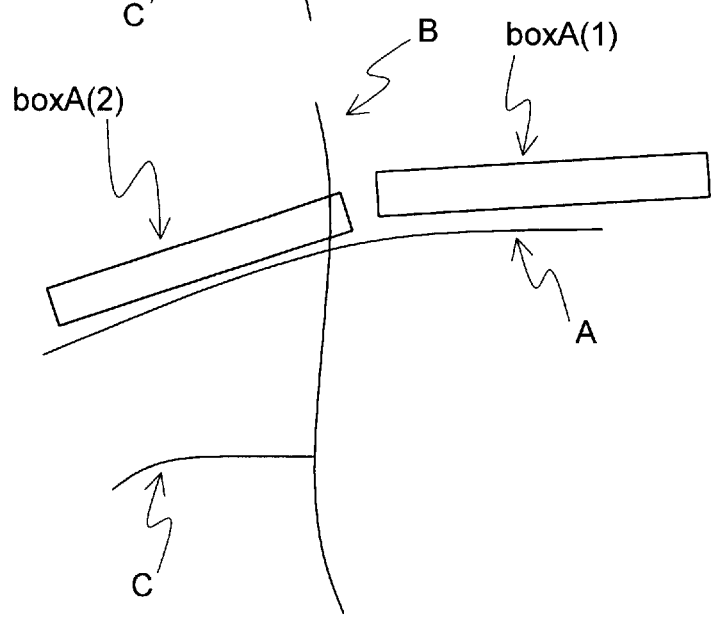
Figure 7C:
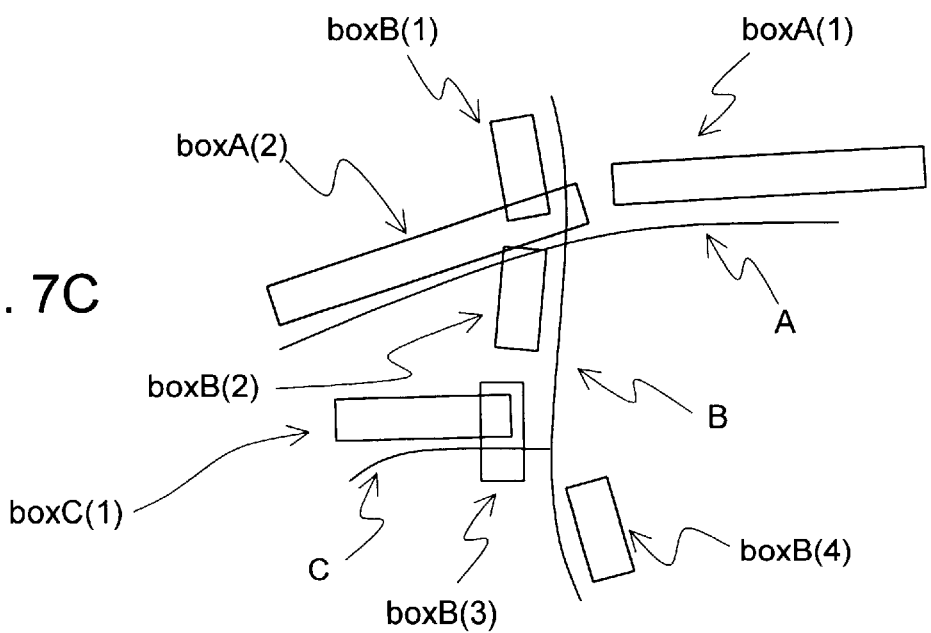

FIGS. 7A, 7B, and 7C illustrate steps in one process for determining candidate locations for text placement. In FIG. 7A, a portion of the entire map image is displayed. FIG. 7A shows three lines, labeled A, B, and C. These lines represent roads in the geographic area being displayed in the map image. The shapes and locations of the lines are determined by appropriate programming in the map display program 100 using the cartographic data 104(carto) in the geographic database.

One of the represented roads (e.g., labeled "A," in FIG. 7A) is selected. The name reference 140(4) in the data entity 140 (shown in FIG. 2) that represents the geographic feature is used to find the name data entity 150 (shown in FIG. 3) that contains the text string of the name of the represented geographic feature. This referenced name data entity 150 is obtained from the navigable feature name data 104(name) in the geographic database 104 (shown in FIG. 1). The name text string 150(2) is examined to determine the length of the name in order to determine the length for the text box required to contain the name of the represented geographic feature.

Starting at one end of the line used to represent the geographic feature, a text box is located adjacent to the line. FIG. 7B shows the step of placement of this text box, labeled boxA(1), adjacent to the line A. The text box is set at an angle so that it is generally parallel to the portion of the line A to which it is directly adjacent. After determining the position of the first text box, the remainder of the line representing the geographic feature is-examined. If there is room along the line representing the geographic feature for another text box, an additional text box is defined in a similar manner as the first text box. As shown in FIG. 7B, an additional text box, labeled boxA(2) is shown positioned along the line labeled "A." Each additional text box is located adjacent to and along the line representing the geographic feature. Also, each additional text box is in an end-to-end relationship with the previous box. After defining a position for a text box, the remainder of the length of the line representing the geographic feature is examined to determine whether there is room for placement of another candidate text box. This process continues until there is no more room for the placement of text boxes along the length of the line representing the geographic feature.

Each text box formed for a geographic feature with the same name has the same size. If the geographic feature being displayed is other-than-straight, the text boxes may be located at different angles, as shown in FIG. 7B. If desired, each text box along a line representing a geographic feature can be spaced a configurable distance from the next text box.

After identifying all the possible locations for candidate text boxes adjacent to the represented geographic feature, another geographic feature is selected and the process is repeated. The length of the name of the represented geographic feature is obtained from the navigable feature name data 104(name) in order to determine the text box size and then, locations for placement of text boxes along the line representing the feature are identified. FIG. 7C shows placement of text boxes, labeled boxB(1), boxB(2), and boxB(3), along the line labeled "B" and the placement of a text box, labeled boxC(1) along the line labeled "C." As shown in FIG. 7C, the text boxes for the line labeled "B" are relatively short indicating that the name of the represented feature is short and the text boxes for the line labeled "A" are relatively long indicating that the name of the represented feature is long.

The above process is used for all the geographic features to be displayed. As a result of the above process, a plurality of rectangular boxes are defined along the lines and other shapes used to represent geographic features to be displayed.

The above-described process is one way to determine candidate locations for text placement. Other procedures may be used.

Although the candidate location generation program 200 can identify suitable positions for placement of text adjacent to the lines or other shapes that represent geographic features, it does not attempt to avoid overlapping a candidate text box generated for one represented geographic feature with a candidate text box generated for another represented geographic feature. Because placement of rectangular boxes proceeds along the line (or shape) for each represented geographic feature from one end to the other, it is possible (and in many situations likely) that a text box for one geographic feature will overlap with the text box for another geographic feature. For example, at the location of an intersection of two roads on a map display, the text box for one road may overlap with a text box defined for the intersecting road. This condition is illustrated in FIG. 7C. As illustrated in FIG. 7C, the text box labeled boxB(3) overlaps with the text box labeled boxC(1). Also, the text box labeled boxA(2) overlaps with both the text box labeled boxB(1) and the text box labeled boxB(2). If text were placed in all these text boxes, the overlapping text could be hard to read. Accordingly, overlapping text in a map display image is to be avoided. Therefore, after all the candidate locations for text placement are defined, a means is provided to identify overlapping candidate locations for text placement and to select only one of the candidate locations for use for text placement. This function, as well as other functions, is performed by the text placement program 300, described below.

IV. Selection of Locations for Text Placement

A. Overview

As mentioned above, the candidate locations defined by the candidate location generation program 200 are located at positions along each of the representations of geographic features without regard to whether text placed at the candidate location associated with one of the represented geographic features would overlap the text placed at another candidate location associated with another of the represented geographic features. If text were placed at all the location identified by the candidate location generation program, the overlapping text could render the map unreadable, or at least not user-friendly. Therefore, the text placement program 300 provides a means to select some of the candidate locations generated by the candidate location generation program 200 for placement of text. The remaining candidate locations are left unused.

When selecting which of the candidate locations to use for placement of text, features are desired in the resultant image to provide a map that is user-friendly and that conforms to conventional user expectations. Generally, it is preferred that each geographic entity, such as a road, which is represented on the map image be named at least once. Also, it is preferred that names of different represented geographic features do not overlap. Further, it is preferable that the map image usually include names for more important geographic features. For example, on some types of maps it is more important that the map image include a name for a road with relatively greater traffic volume, such as an expressway, than a road with a relatively smaller traffic volume, such as a side street. The text placement program 300 can take all these factors in account when selecting which candidate locations to use for placement of text.

Referring to FIG. 5, the text placement program 300 may be part of the map display program 100. The text placement program 300 uses the data generated by the candidate location program 200. Using this data, the text placement program 300 selects which of the candidate locations are to be used for placement of text. The text placement program 300 provides an output that indicates the selected locations. The output of the text placement program 300 is provided to another program 500 that places the text at the selected locations and displays the representations of the geographic features and the associated text names as the map image 112 on the display 116. The candidate locations not selected for text placement by the text placement program 300 are left blank.

When selecting in which candidate locations text should be placed, the text placement program 300 evaluates each candidate location. For each candidate location, the text placement program 300 uses an expression having the following form:

$$\{\text{rank clause}\}+\{\text{type 0 clause}\}+\{\text{type 1 clause(s)}\}. \qquad (1)$$

The above expression includes three types of clauses. Each of the clauses makes a contribution to an overall weight of the clause. For each candidate location, the expression is evaluated for two possible conditions (i.e., place text or not place text). The objective at each location is to select the one of the two possible conditions that yields the higher overall weight.

The rank clause includes the rank of the represented geographic feature (e.g., a road). The rank clause is assigned a first weighting. The rank clause is optional and may be omitted. If the rank clause is omitted, the rank of the represented feature is not a factor in whether the candidate location is selected.

In the above expression, the type 0 clause provides a value indicative of the represented geographic feature being named at least once. The type 0 clause is assigned a second weighting. The expression used for each candidate location includes one type 0 clause.

In the above expression, the type 1 clause provides a value indicative of the text box formed for the candidate location not overlapping with a text box formed for another candidate location. The type 1 clause is assigned a third weighting. A type 1 clause is included for each occurrence that the text box associated with the candidate location being evaluated overlaps with a text box associated with another candidate location. If the text box associated with the candidate location being evaluated does not overlap a text box associated with another candidate location, there is no type 1 clause in the expression.

The terminology "type 1 clause" and "type 0 clause" is arbitrarily assigned and other terminology may be employed. (In the source code appendix included as part of the present specification, the type 1 clause is referred to as the type 0 clause, and vice versa.) The weightings assigned to each of the clauses in the expression are configurable. The weightings may be set to suitably large or small values to configure the text placement program to provide the desired results. (A weighting may be omitted which is equivalent to setting the weighting to "1.")

The processes included in the text placement program 300 provide for composing the above expression for each candidate location and then using the expression to determine whether to use the candidate location for the placement of text. A first process in the text placement program 300 forms the type 0 clauses used for indicating whether each represented geographic feature is named at least once. Another process in the text placement program evaluates the text box associated with each candidate location to determine whether it overlaps any other text box formed for another candidate location. If two text boxes overlap, the text placement program forms a type 1 clause indicative thereof. After each candidate location is evaluated for overlapping and the type 1 clause(s) formed if necessary, the above expression (1) is used to evaluate placement of text at the candidate location. When using the expression, the text placement program evaluates the expression for two conditions: placement of text in the candidate location and no placement of text in the candidate location. The results of the two evaluations of the expression are compared. The condition that provides the greater result is selected. All the candidate locations are evaluated in this manner. The processes included in the text placement program are described in greater detail below.

B. Forming Clauses to Evaluate Naming Feature at Least Once

As described above, the candidate location generation program 200 defined candidate locations for text placement. Each candidate location for text placement defines a rectangular area or text box located in the area to be displayed.

Figure 8:
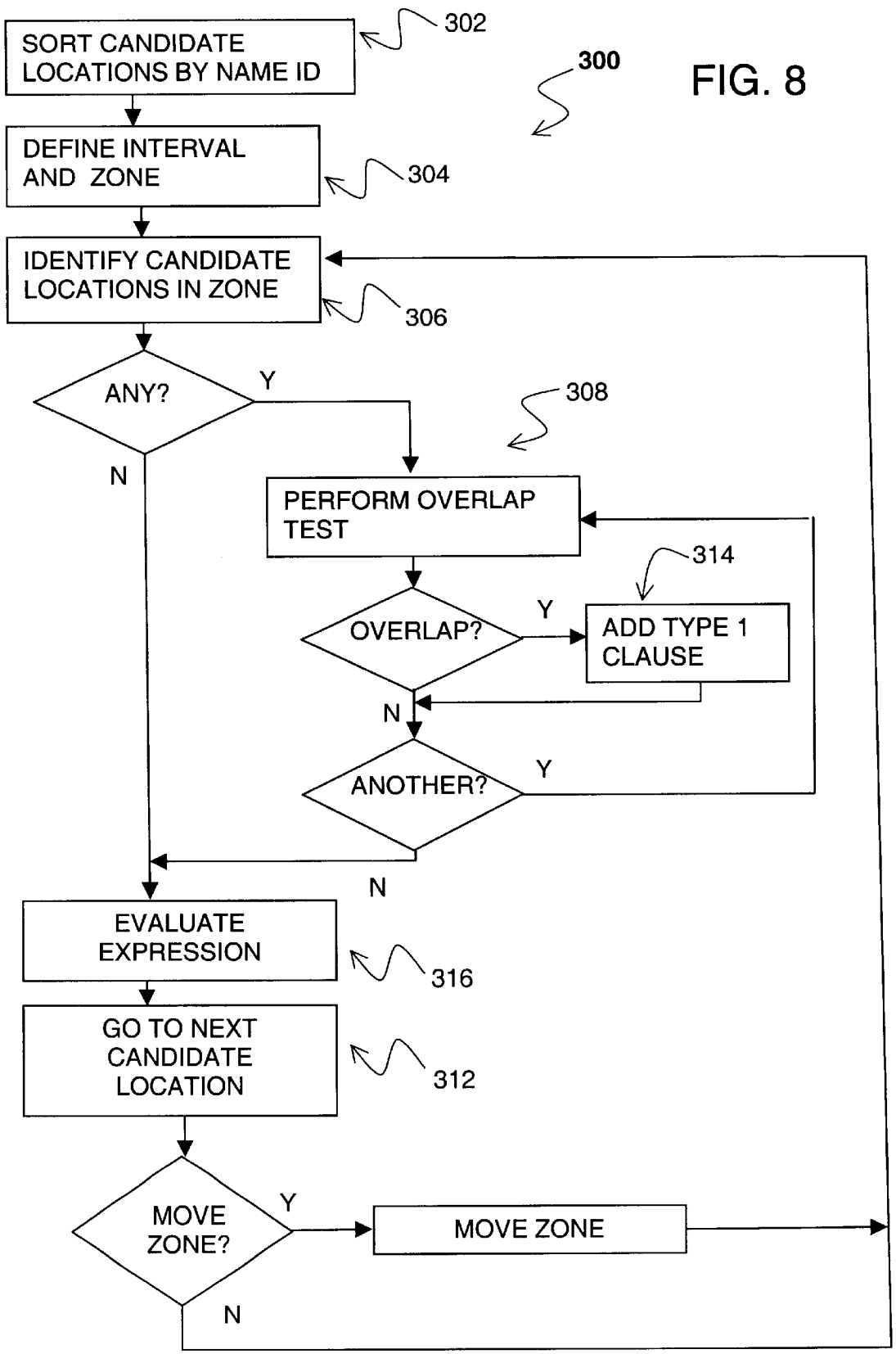
FIG. 8 is a flow chart showing steps performed in the text placement program shown in FIG. 5.

FIG. 8 shows a flowchart of the overall processes performed by the text placement program 300. An initial portion of the text placement program 300 forms the clauses that account for placement of text in at least one text box for each represented geographic feature. Associated with each candidate location is a navigable feature name ID (150(1) in FIG. 3) which corresponds to the navigable feature name (150(2) in FIG. 3) of the represented geographic feature. As part of the initial portion of the text placement program 300, all the candidate locations identified by the candidate location generation program 200 are sorted by navigable feature entity ID (Step 302 in FIG. 8). This results in ordering all the candidate locations that have the same navigable feature name next to each other in the sorted list.

The sorted list of candidate locations is traversed from one end to the other. A type 0 logical clause is defined for all the candidate locations that have the same navigable feature ID. A type 0 logical clause is a disjunction of one or more uncomplemented logical variables as well as a positive weight. The type 0 logical clause has the form:

$$w_2\{x_1 V x_2 V x_3\} \tag{2}$$

where $x_1$, $x_2$, and $x_3$ are logical variables that represent the text boxes of candidate locations for text placement that have the same navigable feature name and $w_2$ is a weighting assigned to the clause. A variable is set to "1" to represent placement of text in the represented text box. A variable set to "0" represent no placement of text. (V is the logical operator representing a product of "or's".) The weighting, $w_2$, assigned to the clause may be set to any value. In one embodiment, the weighting is related to the relative importance of the represented geographic feature. For example, the weighting, $w_2$, can be set to (1+R), where R is the rank of the represented geographic feature.

A type 0 clause can have one or more logical variables depending upon the number of candidate locations that share the same navigable feature ID (and therefore have the same name). For example, if the candidate location generation program 200 determined five candidate locations for placement of text adjacent to a line used to represent a road with a single name in a map image, the type 0 clause formed for these candidate locations would have five logical variables, one for each of the candidate locations. The type 0 clause formed to represent these five candidate locations would have the form:

$$w_2\{x_1 V x_2 V x_3 V X_4 V X_5\} \tag{3}$$

If the candidate location generation program 200 identified only one candidate location for a represented geographic feature, the type 0 clause would have the following form:

$$W_2\{X_1\} \tag{4}$$

The type 0 clause implicitly imposes the condition that each represented geographic feature (e.g., a road) be labeled at least once, otherwise the clause is not satisfied. If the clause is not satisfied (i.e., equals zero), it makes no contribution to the overall weighting of the expression for that condition.

Because the candidate locations are sorted in order by navigable feature ID, type 0 logical clauses for all the different navigable feature names can be formed with a single pass through the sorted list of candidate locations. Each candidate location associated with a represented geographic feature that is also associated with the same navigable name uses the same type 0 clause when being evaluated, as described below.

C. The Rank Clause

As mentioned above, the expression used to evaluate a candidate location may include a rank clause. A rank clause has the form:

$$w_1\{(1+\text{rank})^* x_1\} \tag{5}$$

where $x_1$ is a logical variable that represents the text box for the candidate location being evaluated. As stated above, the variable is set to "1" to represent placement of text in the represented text box and set to "0" to represent no placement of text. A "1" is added to the rank so that geographic features having a rank of "0" are not unweighted.

D. Evaluating Candidate Locations

After the type 0 clauses are determined for all the candidate locations, the candidate locations are evaluated. Using the above-described expression, each candidate location is evaluated, one at a time, for the two possible conditions: placement of text in the candidate location and no placement of text in the candidate location. Prior to using the expression, the text box associated with each candidate location is tested to determine if it overlaps any other text box for another candidate location. If a text box for a candidate location being evaluated overlaps with a text box for another candidate location, the expression used for evaluating the text box includes a type 1 clause.

A type 1 clause consists of a weighted disjunction of precisely two complemented variables which represent the overlapping text boxes. The type 1 clause has the following form:

$$w_{12}\{x_1' V x_2'\} \tag{6}$$

In the type 1 clause, one of the two variables (e.g., $x_1$ or $x_2$) represents the text box associated with the candidate location being evaluated and the other of the two variables represents the text box that overlaps with the text box associated with the candidate location being evaluated. As stated above, a variable is set to "1" to represent placement of text in the represented text box and a variable set to "0" represents no placement of text. Thus, whenever both $x_1$ and $x_2$ are set to "1", the clause is not satisfied and the value of the clause is zero. When the value of the clause is zero, the clause makes no contribution to the overall value of the expression for the condition being evaluated.

The weighting, $w_{12}$, in the type 1 clause can be set to any value. In one embodiment, the weighting takes into account the relative importance (i.e., rank) of the geographic feature associated with the text box $x_2$ that overlaps with the text box $x_1$ associated with the candidate location being evaluated. For example, in one embodiment, the weighting, $w_{12}$, is equal to $w_3(1+R_2)$, where $w_3$ is a weighting related to the importance (e.g., rank) of the geographic feature associated with the text box being evaluated and $R_2$ is the rank of the geographic feature associated with the overlapping text box.

As mentioned above, the type 1 clause indicates overlap with another text box associated with another candidate location. A type 1 clause is included for each occurrence of overlapping between the text box associated with the candidate location being evaluated and a text box associated with another candidate location. For example, if the text box being evaluated overlaps with two other text boxes, two type 1 clauses are included in the expression used for evaluation for the candidate location—one for each occurrence of overlapping. The following illustrates the use of two type 1 clauses to represent overlap of a text box associated with a candidate location with the text boxes associated with two other candidate locations:

$$w_{12}\{x_1'\nabla x_2'\}+w_{13}\{x_1'\nabla x_3'\} \quad (7)$$

In the above clauses, $x_1$ represents the text box being evaluated, $x_2$ represents one of the other text boxes overlapping with the text box represented by $x_1$, and $x_3$ represents the other of the text boxes overlapping with the text box represented by $x_1$. In this situation, the weighting, $w_{12}$, in the first type 1 clause is set to $w_3(1+R_2)$, where $w_3$ is a weighting related to the importance (e.g., rank) of the geographic feature associated with the text box being evaluated, $x_1$, and $R_2$ is the rank of the geographic feature associated with the overlapping text box, $x_2$. The weighting, $w_{13}$, associated with the second type 1 clause is set to $w_3(1+R_3)$, where again $w_3$ is a weighting related to the importance of the geographic feature associated with the text box, $x_1$, and $R_3$ is the rank of the geographic feature associated with the second overlapping text box, $x_3$. By including the rank of the geographic feature associated with the overlapping text box in the weighting for each type 1 clause, the relative importance of the geographic feature associated with the overlapping text box can contribute to (and thereby factor into) the overall evaluation of the expression for text placement at the candidate location.

In the foregoing example, there were two type 1 clauses that represent the overlap of the text box associated with the candidate location being evaluated by two other text boxes. If the text box associated with the candidate location being evaluated is overlapped by three other text boxes, then the expression used to evaluate placement of text at the candidate location would include three type 1 clauses, each with its associated weighting, as described above. Overlap of the text box associated with the candidate location being evaluated by four other text boxes would require four type 1 clauses, and so on.

A type 1 clause is included in the expression used to evaluate a candidate location only when the text box associated with the candidate location being evaluated overlaps with another text box. If the text box associated with the candidate location being evaluated does not overlap with another text box, no type 1 clause is included in the expression used to evaluate the candidate location. (As mentioned above, the type 1 clause is required to have precisely two variables.)

E. Defining Intervals and Zones

As explained in the foregoing section, in order to evaluate a candidate location for text placement, it is first determined whether the text box associated with the candidate location being evaluated overlaps with a text box associated with any other candidate location. If the candidate location generation program 200 generates a large number of candidate locations, there could be very large number of combinations of text boxes to check for overlapping. The text placement program 300 provides a way to expedite this process.

The text placement program 300 defines a relatively small portion of the entire map display image and evaluates at one time only the candidate locations located in or around the relatively small area. This expedites the process of checking for overlapping text boxes because only text boxes located relatively close together possibly overlap and therefore need to be tested. Text boxes located relatively far away from the text box being evaluated can be ignored.

Figure 9:
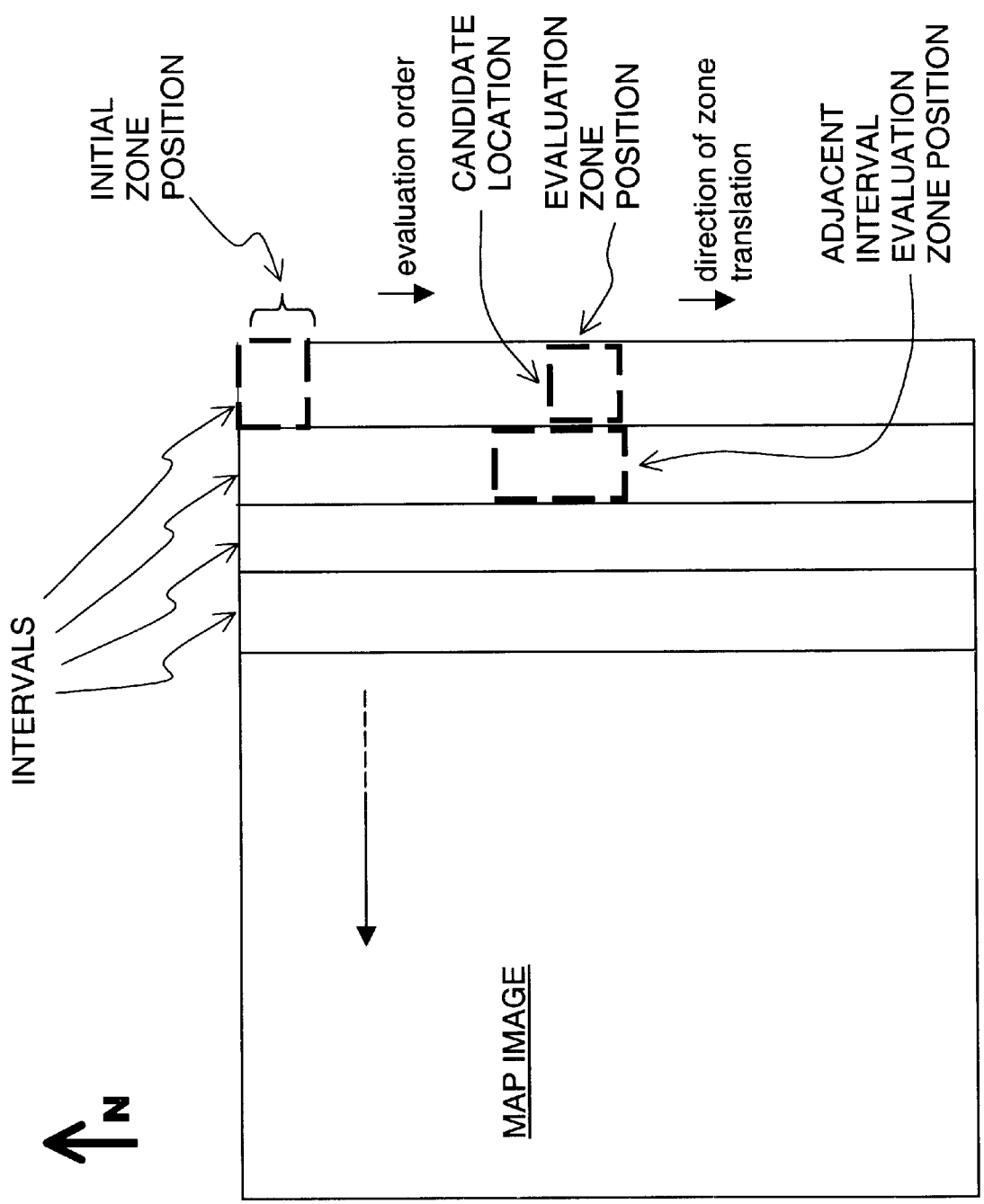
FIG. 9 is a diagram illustrating formation of intervals included in a process performed by the text placement program shown in FIGS. 5 and 8.

To implement this process, the text placement program 300 divides the entire map image area to be displayed into a plurality of relatively narrow intervals or strips (Step 304 in FIG. 8). FIG. 9 shows the map display area divided into a plurality of intervals. Each interval represents a strip of the map display from one boundary of the display image to the opposite boundary. As shown in FIG. 8, each interval extends from the top side of the map image to the bottom side. Each interval preferably has the same width as the other intervals and the area to be displayed is separated into a whole number of intervals. (Alternatively, the intervals can be defined as horizontal strips from the left boundary to the right boundary, or in diagonal strips across the map image.)

The width of the interval is related to the maximum size text box formed by the candidate location generation process 200. The width selected for the intervals is greater than the maximum dimension (i.e., length) of any of the rectangular text boxes defined by the candidate location generation program. The text placement program 300 includes a process that examines the previously defined candidate text boxes to determine the text box with the maximum length. (Typically, this may be the text box defined for the geographic feature with the longest name.) Then, a width for the intervals is selected so that the interval width is greater than the length of the text box with the maximum length. Then, taking into account that the intervals preferably all have the same width and that the area to be displayed be divided into a whole number of intervals, the interval width is selected. For example, the smallest dimension that satisfies these conditions may be selected. (In another alternative, a larger interval width can be selected, however this might result in testing more combinations of text boxes for overlapping including text boxes that are located too far away from each other to possibly overlap. In another alternative, if all the intervals are not constrained to have the same width, a smaller interval width may be selected with the result that one more interval, narrower than the others, would be produced.)

After determining the dimension for the interval width, testing of candidate locations for overlapping and then evaluation of candidate locations for text placement can begin. The intervals establish the order in which the candidate locations are evaluated. The interval at one edge (e.g., the easternmost edge) of the map display area is selected first. All the candidate locations in this interval are evaluated. Then, the candidate locations in the next interval adjacent thereto are evaluated, and so on, until all candidate locations in all the intervals are evaluated.

Within an interval, the candidate locations are evaluated in order by latitude. (Alternatively, if the intervals were defined to extend in an east-west direction, the candidate locations would be evaluated in order by longitude). The order in which the candidate locations are evaluated can be either ascending order or descending order, and is preferably consistent for all the intervals. For example, the northernmost candidate location in the easternmost interval is evaluated first, then the next most northernmost candidate location in the easternmost interval is evaluated and so on. After all the candidate locations in the easternmost interval are evaluated, the northernmost candidate location in the interval located immediately to the west of the easternmost interval is evaluated, and so on.

Within each interval, testing for overlapping with a text box for a candidate location is restricted to only those text boxes associated with other candidate locations located nearby. To accomplish this, the text placement program 300 defines a relatively small section, referred to as a "zone" (Step 304 in FIG. 8). The zone is defined as a section of the interval having a length sufficiently long so that any possible overlap between two text boxes, each of which has the greatest length as defined by the candidate location generation program 200, is detected. In one embodiment, the zone is defined as a section of the interval having a length greater than the length of the longest text box defined by the candidate location generation program 200. The zone is positioned along the length of the interval so that it extends ahead of the candidate location being evaluated from the latitude of the candidate position being evaluated. Therefore, as the candidate locations are evaluated in order by descending latitude, the position of the zone along the interval length changes, e.g., slides downward.

With the zone positioned ahead of the candidate location being evaluated, any other text box associated with a candidate location within the zone (or a second zone, as described below) is identified (Step 306 in FIG. 8). The text box of the candidate location being evaluated is tested for overlapping with each other identified text box associated with a candidate location within the zones (Step 308 in FIG. 8). (A process for testing for overlapping is described below.)

In addition to testing for overlapping with the text box associated with each other candidate location in the zone ahead of the candidate location being evaluated, the text box for a candidate location being evaluated is also tested for overlapping with the text boxes associated with candidate locations, if any, in a second zone located in the next adjacent interval. This second zone in the next adjacent interval is located directly adjacent to the candidate location being evaluated. Testing the text boxes in the adjacent interval addresses the situation in which the boundaries of a text box extend across two intervals. For example, a text box located in a first interval with its center (anchor) near the boundary between the first interval and a second interval may extend into the second interval and overlap with a text box which is located within the second interval. Accordingly, the text box for the candidate location being evaluated is tested for overlapping with any text boxes in the adjacent interval in a zone in the adjacent interval located immediately adjacent to the candidate location being evaluated. The size of the zone in the adjacent interval is determined to have a length sufficiently long so that any possible overlap between two text boxes, each of which has the greatest length as defined by the candidate location generation program 200, is detected. (Because the interval width is selected to be greater than the width of the longest text box, the text boxes located in only the one interval immediately adjacent to the interval containing the candidate location being evaluated need to be tested for overlapping.)

The candidate locations in each of the intervals are evaluated in a similar manner (Step 312 in FIG. 8). Thus, the zone containing the candidate locations being evaluated forms a raster-like sweep across the entire map image from one corner of the map display image to the opposite corner.

F. Checking for Overlap

Various processes are known for checking for overlapping or intersection of geometric shapes. Any suitable procedure can be used to check for whether the text box of the candidate location being evaluated overlaps with the text box associated with any other candidate location. The process used in an embodiment of the present text placement program is described as follows.

As defined by the candidate location generation program 200, each candidate location is associated with a text box defined by an anchor, a text string length, and an angle. This information.(including the font size) is sufficient to determine the coordinates of the corners of the rectangular text box formed for each candidate location. In an embodiment of the overlapping test process used by the text placement program 300, the text box of the candidate location being evaluated is translated and rotated from the coordinate system of the map display to a coordinate system in which the anchor of the text box of the candidate location being evaluated is defined at (0,0). This centers the text box of the candidate location being evaluated so that its corners have the coordinates (+x, +y), (−x, +y), (+x, −y), and (−y, −x). The text box associated with the other candidate location is also translated and rotated by the same amounts so that its position relative to the text box of the candidate location being evaluated remains the same.

Then, several tests are performed to determine whether the text boxes overlap. If the minimum y-coordinate of the other text box is greater than the +y coordinate of the text box of the candidate location being evaluated and the minimum x-coordinate of the other text box is greater than the +x coordinate of the text box of the candidate location being evaluated, no overlap occurs. Similar tests are can be used to test for overlapping in the other directions.

Figure 10:
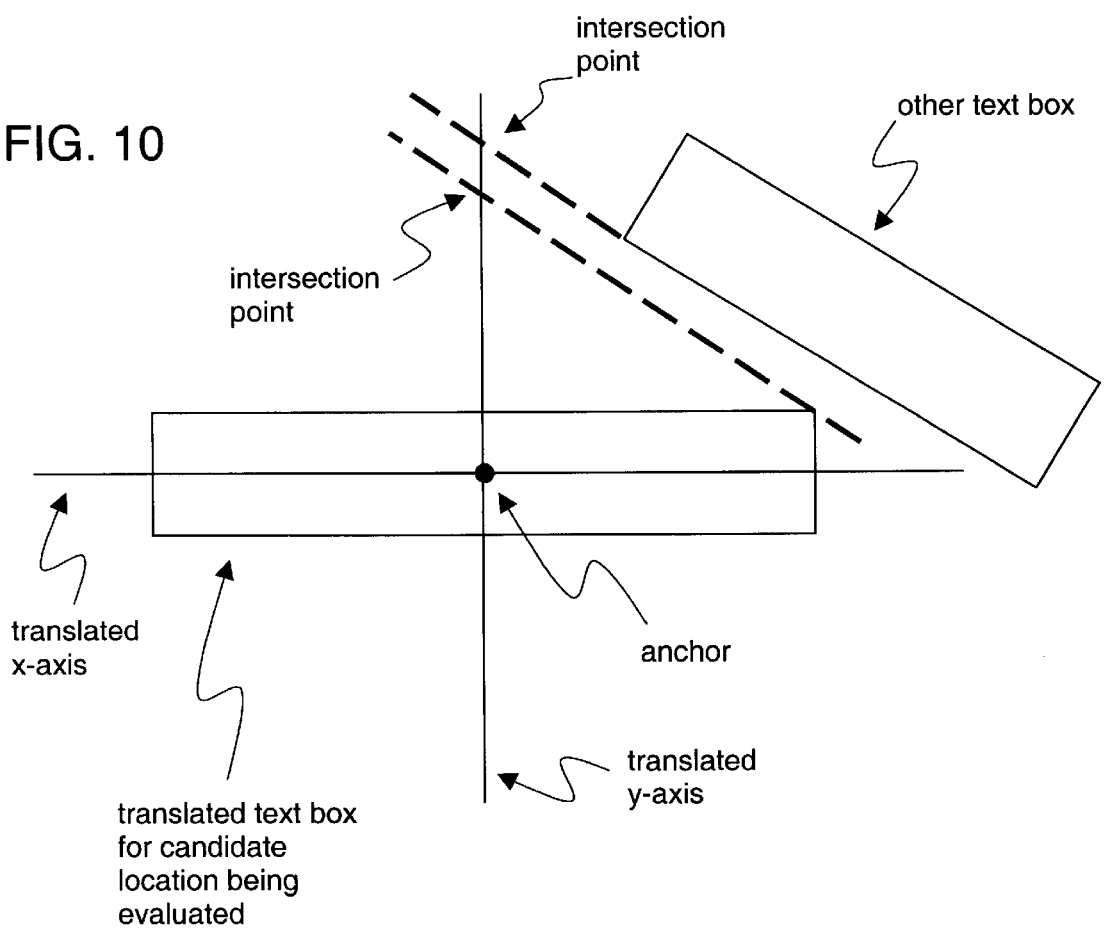
FIG. 10 is a diagram illustrating a process for testing for overlapping text boxes performed by the text placement program shown in FIGS. 5 and 8.

If the other text box is located in a position like the one shown in FIG. 10, the previous tests will not resolve whether an intersection of text boxes occurs. In this case, the intersection with the y-axis of a line extended from a side of the other text box is compared to the intersection with the y-axis of a parallel line through the corner of the text box of the candidate location being evaluated. This comparison determines whether the text boxes overlap.

G. Evaluating Expression for Two Conditions

After each candidate location has been tested for overlapping and the one or more type 1 clauses formed, if necessary, and added to compose the evaluation expression (Step 314 in FIG. 8), the expression can be evaluated for the two conditions, i.e., text placement or no text placement (Step 316 in FIG. 8). The condition with the greater result is selected.

The expression is evaluated for each condition by setting the value of the variable that represents the candidate location to each possible value (i.e., "1" and "0") and then evaluating the expression. Evaluating the expression includes calculating the sum of the one or more clauses in the expression for the selected condition. Specifically, the value of the variable is set to "1" to represent placement of text in the candidate location and then the expression is evaluated a first time to provide a first result ("result1"). Then, the value of the variable is set to "0" to represent no placement of text in the candidate location and then the expression is evaluated a second time to provide a second result ("result0").

When an expression is evaluated, the values of the other variables in the expression are set to reflect a random probability of text placement or no text placement in the text boxes represented by the other variables unless the variable represents a text box for which a selection of text placement or no text placement has already been made in which case the variable is set to the selection already made.

For example, an expression used to evaluate a candidate location includes a type 0 clause and may include one or more type 1 clauses and a rank clause. If the represented geographic feature has two text boxes associated with it, the type 0 clause has the following form.

$$\{x_1 V x_2\} \tag{8}$$

where the text box being evaluated is represented by the variable $x_1$ and the other text box is represented by the variable $x_2$. If the text box represented by $x_2$ has not yet been evaluated, then $x_2$ can either have text or not have text. This probability is ½ and the value of $x_2$ in the clause is set to ½. With the value of $x_2$ in the clause set to is ½, $x_1$ is set to the value of "1" to evaluate the expression for the condition of text placement at the candidate location. Then, with the value of $x_2$ in the clause set to ½, $x_1$ is set to the value of "0" to evaluate the condition of no text placement. Then, the two results are compared and the condition associated with the greater result selected. In the cases in which the type 0 clause includes more than two variables (as shown in the examples at (2) and (3), above), the random probability is determined in a similar manner.

A type 1 clause is evaluated in a similar manner taking into account that the variables are complemented.

If a rank clause is included, it is also evaluated similarly. The higher the rank, the greater the contribution to the value of the expression. This tends to result in higher ranked geographic features being named more frequently than lower ranked geographic features.

Then, the next candidate location is evaluated. Candidate locations are evaluated in the order defined by their location in the intervals, as explained above. Each candidate location is evaluated for overlapping only with the other candidate locations in the zone in the interval in which it is located or the area immediately adjacent the zone. As the candidate locations are evaluated and a determination to place text or not place text in a box is made, the selected condition is reflected in subsequent evaluations of other candidate locations. In other words, once a determination is made to place text or not place text in a candidate location, the variable that represent the candidate location is thereafter restricted to its selected value in any expression that includes the variable in any of its clauses. This can affect the evaluation of conditions in the subsequent candidate locations. For example, in the type 0 clause shown at (8) above, if an evaluation had already been made to place text in the text box represented by $x_1$, the value of $x_1$ would be set to "1." Therefore, when the clause was being evaluated for the two conditions for $x_2$, the results would both be "1." This indicates that since the geographic feature had already been assigned a name (in the text box represented by $x_1$), adding the name again in the text box represented by $x_2$ is not preferred. However, if the previous evaluation of $x_1$ determined not to place text in $x_1$, then $x_1$ would be "0." The text box represented by $x_2$ would represent the last chance to include a name for a represented geographic feature since a decision had already been made not to name the making a single pass through the candidate locations, the text placement program operates relatively fast.

The disclosed embodiments avoid arbitrary determinations about text placement. For each candidate location, the factors are weighted and the placement of text at that location is evaluated. Overlapping of text is not absolutely prohibited. Under some circumstances, it may not be possible to avoid overlapping of text boxes. Likewise, not every represented geographic feature is absolutely guaranteed to be named and under some circumstances it may be possible that a geographic feature is not named. However, the disclosed process provides a means to avoid overlapping and to include a name for each represented feature.

It should be appreciated that the disclosed process provides significant flexbility and configurability. By adjusting the weightings associated with each of the clauses included in the expression used to evaluate each candidate location, one or the other of the factors desired for the map image can be emphasized. For example, by increasing the weighting factor associated with the overlapping clause (i.e., the type 1 clause), the incidence of non-overlapping text can be favored at the expense of naming a represented feature at least once.

Another advantage of the embodiment of the text placement program disclosed above is that it can be used in any kind of map display program and with any kind of program that determines candidate locations for placement of text. The text placement program can be used as a portable programming tool and can be used on various kinds of platforms and systems.

EXAMPLE

As an example, the candidate location generation program 200 may identify approximately 9000 candidate locations for placement of text. The text placement program 300 selects approximately 3000 of these locations for placement of text. The candidate locations not selected by the text placement program 300 are not used for placement of text, i.e., they are left blank. It is understood that the number of candidate locations and the number of selected locations are related to various factors, including the type of geographic area being displayed, the level of detail desired by the end-user, the boundaries of the geographic area being displayed, the size and type of text used for the names of the represented geographic features, and so on.

VIII. Alternatives

As mentioned above, weightings are assigned to the different clauses in the expression used to evaluate each candidate location for text placement. These weightings can be modified so that the text placement program tends to favor certain results. For example, a relatively high value assigned to the weighting associated with the type 1 clause increases the likelihood that none of the text names overlaps another. Similarly, a relatively high value assigned to the weighting associated with the type 0 clause increases the likelihood that each represented geographic feature be named at least once. A relatively high value assigned to the weighting associated with the rank clause increases the likelihood that higher ranked roads are named compared to lower ranked roads. In alternative embodiments, other factors can be included in the evaluation expression and assigned weightings as desired. For example, a separate weighting factor for toll roads can be included and the map image rendered would tend to have the toll roads named. Similarly, a separate weighting factor can be included for scenic road (provided the geographic database includes attributes for scenic roads.) In a further alternative, a weighting factor can be assigned to geographic features, such as roads, that are located along a calculated route. In still a further alternative embodiment, a weighting factor can be assigned to geographic features, such as roads, that are located in a direction along which the vehicle is heading.

In the above description of the disclosed subject matter, the text placement process was described in the context of a map display program that renders a map image on a display for viewing by an end user. The disclosed program has other uses. For example, the disclosed program can be used in a map compiling process that determines appropriate locations for text placement and then stores data identifying the selections for later use. For example, once the text placement program has identified suitable locations for text placement, the selected locations can be saved. Then, at a later time when an end user wishes to view a map image, the previously selected positions for text placement can be restored and used without running the text placement program again. The stored locations for text placement can be used even if the map boundaries are different or the map scale is different.

The text placement program can also,be used for the formation of printed maps.

In the disclosed embodiment, the weightings are assigned positive values. In alternative embodiments, negative weightings can be used to suppress certain factors.

The concepts of the disclosed embodiment can be extended by further modification of the clauses including their associated weightings. For example, more complex clause constructions can be formed to produce maps in which the represented geographic features are named twice, or three times or more. Using clause constructions of the type disclosed above, the length of a represented geographic feature can be used in a weighted clause so that represented geographic features of smaller lengths are suppressed and features of greater lengths emphasized for name placement. Various other kinds of factors can be formulated.

The disclosed embodiments can be used for placement of text on maps to represent any kind of geographic feature. For example, in addition to placing text for naming roads, the disclosed embodiments can be used for placement of text for points of interest, lakes, railroads, ferries, buildings, airports, and so on. Some of these other kinds of geographic features are represented by other kinds of geographic shapes, such as polygons. For any of these various kinds of geographic features, a program, such as the candidate location generation program disclosed above, determines candidate locations for text boxes which are then provided to the text placement program. The text boxes for these other kinds of geographic features may be evaluated in the same manner as described above. If desired, when geographic features of different types are being handled by the text placement program, an additional weighted clause may be included in the evaluation expression. This additional weighted clause can be used to cause certain kinds of geographic features to be favored over others. For example, points of interest can be favored over roads, or airports can be favored over restaurants.

In one embodiment, the text placement program, as well as the rest of the map display program and the navigation application, is written in the C programming language. In alternative embodiments other programming languages may be used, such as C++, Java, Visual Basic, and so on.

It is intended that the foregoing detailed description be regarded as illustrative rather than limiting and that it is understood that the following claims including all equivalents are intended to define the scope of the invention.

We claim:

1. A text placement program contained on a storage medium, the program comprising:

a first routine that receives data identifying a plurality of candidate locations for placement of text associated with a plurality of represented geographic feature on a map image;

a second routine that evaluates each candidate location of said plurality of candidate locations using an expression that provides a result, wherein the expression comprises:

a clause of a first type indicative of whether a represented geographic feature is named at least once on the map image by considering whether the represented geographic feature has been previously named in another candidate location;

if a candidate location being evaluated for text placement overlaps another candidate location, a clause of a second type indicative of an occurrence of the candidate location not overlapping another candidate location; and a third routine that determines whether to place text in the candidate location based upon the result provided by the expression.

2. The invention of claim 1 wherein the clause of the first type is weighted.

3. The invention of claim 1 wherein the clause of the second type is weighted.

4. The invention of claim 1 wherein the clause of the first type and the clause of the second type are weighted.

5. The invention of claim 1 wherein the expression further comprises:

a clause of a third type comprised of a term corresponding to a rank assigned to the represented geographic feature.

6. The invention of claim 5 wherein the clause of the third type is weighted.

7. The invention of claim 1 wherein, for each candidate location of said plurality of candidate locations, the text placement program evaluates the expression for two conditions, wherein said two conditions comprise placement of text and no placement in the candidate location.

8. The invention of claim 1 wherein said clause of a first type is comprised of a weighted disjunction of variables, wherein each of said variables represents a separate one of one or more candidate locations for placement of a same name along a represented geographic feature, and wherein each of said variables assumes one of two values, one of said two values indicative of placement of text in the represented candidate location and the other of said two values indicative of no placement of text in the represented candidate location.

9. The invention of claim 1 wherein said clause of a second type is comprised of a weighted disjunction of two complemented variables, wherein each of said variables represents a respective one of two overlapping candidate locations for placement of text, and wherein each of said variables assumes one of two values, one of said two values indicative of placement of text in the represented candidate location and the other of said two values indicative of no placement of text in the represented candidate location.

10. A method performed by a computing platform for forming a map image that represents a plurality of geographic features comprising the steps of:

determining whether to place text at each of a plurality of candidate locations, wherein said plurality of candidate locations comprise locations in the map image at which text can be placed, and wherein each of said plurality of candidate locations is associated with a geographic feature, and wherein each of said plurality of candidate locations is associated with a text string, and wherein the text string associated with a candidate location is also associated with the represented geographic feature associated therewith;

wherein said step of determining comprises:

for each one of said plurality of candidate locations, evaluating placement of text at said one of said plurality of candidate locations, wherein said evaluation produces a first result;

evaluating not placing text at said one of said plurality of candidate locations, wherein said evaluation produces a second result;

comparing said first result and said second result; and determining whether to place text at said one of said plurality of candidate locations based upon said comparing step.

11. A method for forming a map image performed by a computing platform, said map image represents a plurality of geographic features, the method-comprising the steps of:

identifying a plurality of candidate locations in the map image at which text can be placed, wherein each of said plurality of candidate locations is associated with a geographic feature represented in the map image, and wherein each of said plurality of candidate locations is associated with a text string, and wherein the text string associated with a candidate location is also associated with the represented geographic feature associated therewith;

for each represented geographic feature, identifying all the candidate locations associated therewith that are also associated with an identical text string and forming a first type of clause indicative thereof;

for each candidate location, identifying all the other candidate locations overlapping therewith and forming a second type of clause indicative thereof; and for each candidate location, determining whether to include text based upon an evaluation that includes the first type of clause formed by identifying all the candidate locations associated with a represented geographic feature that are also associated with an identical text string being evaluated by considering a probability of whether the text will also be included with another candidate location for the represented geographic feature and evaluating the second type of clause formed by identifying all the other candidate locations overlapping with the candidate location.

12. A method performed with a computing platform for forming a map image that represents a plurality of geographic features comprising the steps of:

determining whether to place text at a plurality of candidate locations, wherein said plurality of candidate locations comprise locations in the map image at which text can be placed, and wherein each of said plurality of candidate locations is associated with a geographic feature represented in the map image, and wherein each of said plurality of candidate locations is associated with a text string, and wherein the text string associated with a candidate location is also associated with the represented geographic feature associated therewith;

wherein for each of said plurality of candidate locations, said step of determining is based upon at least two factors, wherein a first factor favors placement of the text string associated with a represented geographic feature at least once in a candidate location associated with the represented geographic feature by considering whether the text string may be also placed in another of said plurality of candidate locations in addition to the one of said plurality of candidate locations; and wherein a second factor favors not overlapping a text string associated with one of said plurality of candidate locations with a text string associated with another of said plurality of candidate locations.

13. The method of claim 12 wherein said step of determining is based upon three factors, wherein a third factor favors placement of each text string associated with a represented geographic feature having a higher rank.

14. The method of claim 12 wherein said first factor includes a statistical probability of placement of text in all other candidate locations associated with the geographic feature that is associated with the one of the plurality of candidate locations for which the step of determining whether to place text is being performed.

15. The method of claim 12 wherein said second factor includes a statistical probability of placement of text in each other candidate location that overlaps the one of the plurality of candidate locations for which the step of determining whether to place text is being performed.

16. The method of claim 12 wherein said first factor includes a statistical probability of placement of text in all other candidate locations associated with the geographic feature that is associated with the one of the plurality of candidate locations for which the step of determining whether to place text is being performed and for which a determination has not already been made whether or not to place text.

17. A method for forming a map image that represents a plurality of geographic features, the method performed on a computing platform comprising the steps of:

determining whether to place text at each of a plurality of candidate locations, wherein said plurality of candidate locations comprise locations in the map image at which text can be placed, and wherein each of said plurality of candidate locations is associated with a geographic feature, and wherein each of said plurality of candidate locations is associated with a text string, and wherein the text string associated with a candidate location is also associated with the represented geographic feature associated therewith;

wherein said determining step comprises:

for each one of said candidate locations, determining whether text placed at said candidate location would overlap with text placed in another candidate location, and evaluating placement of text at said one of said candidate locations taking into account both whether text placed at said one of said candidate locations would overlap with text placed in another candidate location and whether the text string associated with the represented geographic feature included in at least one of the candidate locations associated with the represented geographic feature by considering whether the text string is also placed in the other candidate locations.

18. The method of claim 17 wherein the step of determining whether text placed at said candidate location would overlap with text placed in another candidate location is performed only in an area immediately around the candidate location being evaluated.

19. The method of claim 17 wherein the step of determining whether text placed at said candidate location would overlap with text placed in another candidate location, further comprises the steps of:

defining a plurality of intervals in said map image, wherein each of said plurality of intervals represents a section of the map image extending from one edge to an opposite edge; and wherein all the candidate locations within any interval so defined are evaluated for placement of text prior to evaluation of any candidate locations in any interval in which all the candidate locations have not already been evaluated.

20. The method of claim 17 wherein the step of determining whether text placed at said candidate location would overlap with text placed in another candidate location, further comprises the steps of:

defining a plurality of intervals in said map image, wherein each of said plurality of intervals represents a section of the map image extending from one edge to an opposite edge; and wherein all the candidate locations within an interval are evaluated in order from the one edge of the map image to the opposite edge.

* * * * *